(12) United States Patent
Heibel et al.

(10) Patent No.: US 8,681,920 B2
(45) Date of Patent: Mar. 25, 2014

(54) SELF-POWERED WIRELESS IN-CORE DETECTOR

(75) Inventors: Michael D. Heibel, Harrison City, PA (US); Daniel P. Kistler, Plum, PA (US); Michael C. Prible, Pittsburgh, PA (US); Jorge V. Carvajal, Irwin, PA (US); Jason Palmer, Baden, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 511 days.

(21) Appl. No.: 12/986,217

(22) Filed: Jan. 7, 2011

(65) Prior Publication Data

US 2012/0177167 A1 Jul. 12, 2012

(51) Int. Cl.
*G08B 7/06* (2006.01)
*G21C 17/00* (2006.01)
*G08C 19/00* (2006.01)
*G08B 7/00* (2006.01)

(52) U.S. Cl.
USPC ...... 376/245; 376/254; 376/255; 340/870.01; 340/870.07; 340/870.16; 340/870.17

(58) Field of Classification Search
USPC ............ 376/245–259; 342/21, 22, 27, 42–45, 342/50, 51, 118, 124, 125, 175, 195; 244/3.1, 3.15, 3.16, 158.1, 158.3, 244/172.7; 374/100, 141, 152; 455/7, 11.1, 455/12.1, 13.4; 73/862, 862.381, 862.68; 250/252.1; 340/870.01, 870.07, 340/870.11–870.44
See application file for complete search history.

(56) References Cited

U.S. PATENT DOCUMENTS

| | | | | |
|---|---|---|---|---|
| 3,149,231 | A * | 9/1964 | Ravich | 244/3.16 |
| 3,220,004 | A * | 11/1965 | Gillespie, Jr. | 244/158.3 |
| 3,932,211 | A | 1/1976 | Loving, Jr. | |
| 4,576,781 | A | 3/1986 | Duncombe et al. | |
| 4,731,879 | A * | 3/1988 | Sepp et al. | 342/45 |
| 4,943,683 | A * | 7/1990 | Utsunomiya et al. | 376/245 |
| 5,251,242 | A | 10/1993 | Impink, Jr. et al. | |
| 5,661,766 | A * | 8/1997 | McClelland et al. | 376/245 |
| 5,745,538 | A | 4/1998 | Heibel | |
| 5,787,336 | A * | 7/1998 | Hirschfield et al. | 455/13.4 |
| 5,826,170 | A * | 10/1998 | Hirschfield et al. | 455/13.4 |
| 6,061,412 | A | 5/2000 | Stucker et al. | |
| 6,650,722 | B1 * | 11/2003 | Steiner et al. | 376/259 |
| 6,798,859 | B1 * | 9/2004 | Steiner et al. | 376/259 |
| 6,873,671 | B2 * | 3/2005 | Ishii et al. | 376/259 |

(Continued)

OTHER PUBLICATIONS

J.A. Dunne et al., "The Voyage of Mariner 10 Mission to Venus and Mercury" (SP-424), Chapter 3; NASA Scientific and Technical Information Office, Washington, DC 1978; posted on the Internet at history.nasa.gov/SP-424/sp424.htm; updated Aug. 6, 2004.*

(Continued)

*Primary Examiner* — Bernarr Gregory
(74) *Attorney, Agent, or Firm* — Richard J. Coldren; Westinghouse Electric Company LLC (57) ABSTRACT

A method and apparatus for monitoring a parameter in an irradiated environment and communicating a signal representative of the monitored parameter to a less caustic environment that employs a wireless transmitter that is powered by the irradiated environment. The power for the wireless transmitter is derived from a self-powered radiation detector disposed within the radioactive environment.

11 Claims, 9 Drawing Sheets

(56) References Cited

U.S. PATENT DOCUMENTS

| | | | |
|---|---|---|---|
| 6,948,388 B1 * | 9/2005 | Clayton et al. | 73/862.68 |
| 8,348,504 B2 * | 1/2013 | Gregory et al. | 374/152 |
| 8,445,839 B2 * | 5/2013 | Holaday et al. | 250/252.1 |
| 2005/0128093 A1 | 6/2005 | Genova et al. | |
| 2009/0174397 A1 | 7/2009 | Leclerc | |
| 2011/0002432 A1 | 1/2011 | Heibel et al. | |

OTHER PUBLICATIONS

International Search Report for PCT/US2011/021781 dated Apr. 14, 2011 (Form PCT/ISA/210).

Written Opinion of the International Searching Authority for PCT/US2011/021781 dated Apr. 14, 2011 (Form PCT/ISA/237).

International Preliminary Report on Patentability for PCT/US2011/021781 dated Jul. 10, 2013 (Forms PCT/IB/373, PCT/ISA/237).

* cited by examiner

SELF-POWERED WIRELESS IN-CORE DETECTOR

CROSS REFERENCE TO RELATED APPLICATIONS

This application is related to U.S. patent application Ser. No. 12/986,242, entitled SELF-POWERED WIRELESS IN-CORE DETECTOR, filed concurrently herewith.

BACKGROUND OF THE INVENTION

1. Field of the Invention

This invention pertains generally to methods and apparatus for monitoring the radiation within the core of a nuclear reactor and more particularly to such methods and systems that can economically replace movable in-core detectors in aged operating plants.

2. Related Art

In many of the aged reactors presently in operation, reliance for nuclear flux measurements, as used in the reactor control and protection systems, has been placed on out-of-core detectors supplemented by an in-core flux mapping system, which has been in use since as early as 1967; with the latter originally intended to provide proofs of core design and some calibration measurements.

With a growing trend toward larger reactor cores, there has been some concern as to the possible adverse affects of core power distributions and whether out-of-core detectors could adequately detect such possible adverse distributions. Test data showed that the split section out-of-core detectors, presently in use, responded to axial flux tilt, but the accuracies of the tilt measurements were affected by the geometry and construction materials employed at the detector wells and by the spacing between the vessel and the detectors. Correction factors were developed for these affects, but there was still some question as to whether out-of-core detectors will in all cases provide an adequate alarm of an adverse power distribution.

To obviate the foregoing concern, a method was developed for automatically monitoring the power distribution employing the moveable in-core detectors by providing a more accurate, detailed, automatic, frequently updated, data readout of the reactor core power distribution. The method, taught in U.S. Pat. No. 3,932,211, issued Jan. 13, 1976 and assigned to the Assignee of this invention, inserts the moveable detectors into the reactor core region during normal power operation according to a predetermined, intermittent, timed program. Upon insertion, the detectors are automatically driven through the core region along fixed predetermined paths. The outputs of the detectors are recorded as a function of core location to provide a graphical representation of the reactor power distribution.

Preferably, a plurality of the moveable detectors are arranged in electrically redundant groupings are normally stored within the reactor thermal environment outside of the core reactivity region to minimize thermal cycling. In operation, the detectors are driven into the reactor through the reactor vessel's lower head, through the core support plate and through prescribed fuel assembly bottom nozzles to the fuel assembly instrumentation tubes through which the detector is extended to the desired core elevation. As dictated by the predetermined time program, alternate groupings of detectors are driven along corresponding linear paths within the instrumentation thimbles within the core at staggered time intervals governed by the reactor core physics. The programmed detector drive sequence is automatically reinitiated upon a given controlled reactivity change to provide the most meaningful data input to the plant operator.

Figure 1:
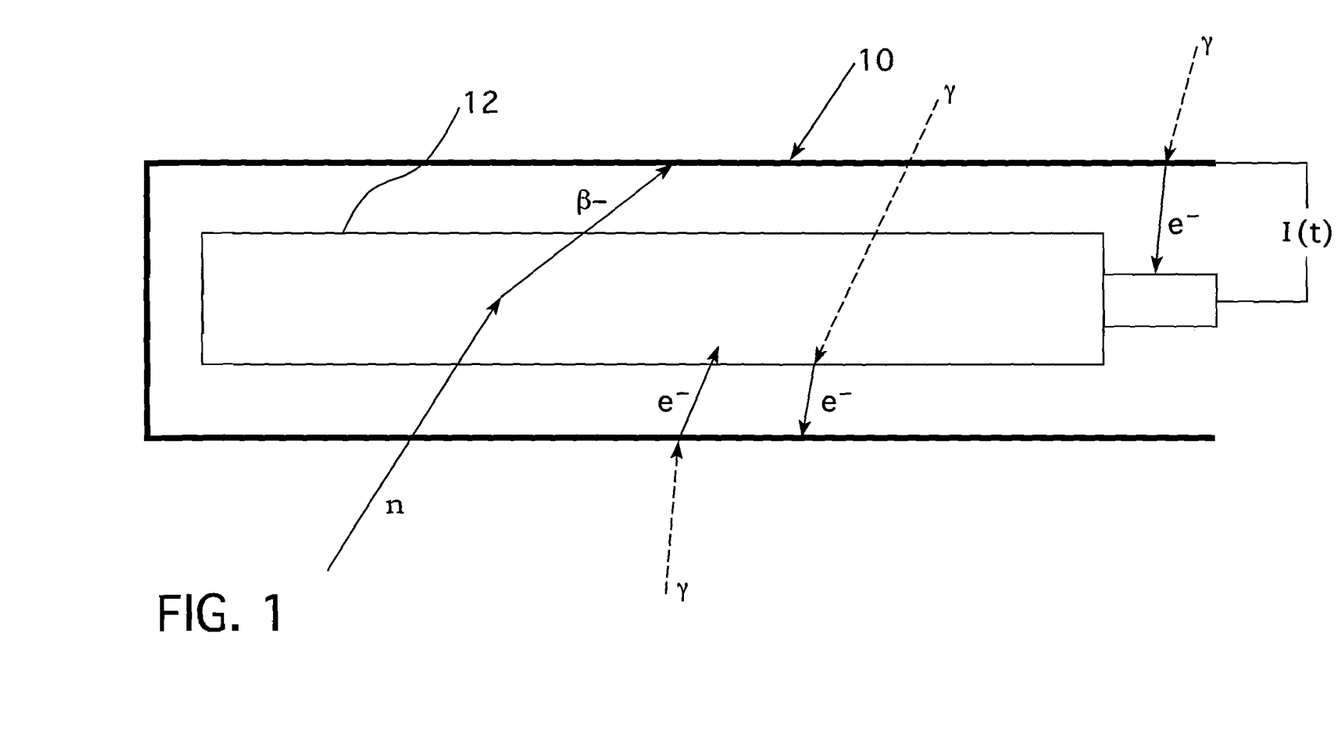
FIG. 1 is a schematic representation of a self-powered detector.
Figure 2A:
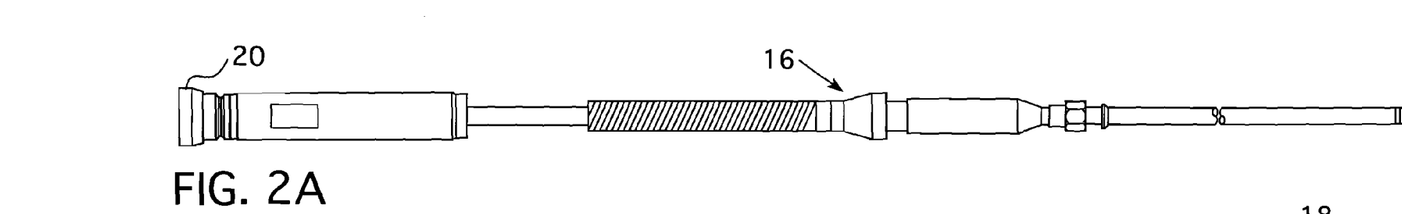
FIG. 2A is a plan view of an in-core instrument thimble assembly.
Figure 2B:
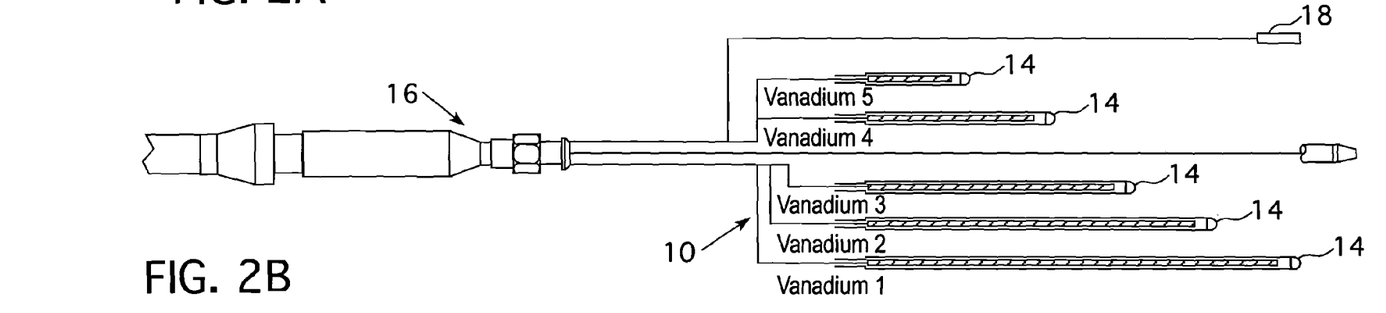
FIG. 2B is a schematic view of the interior of the forward sheath of the in-core instrument thimble assembly of FIG. 2A.
Figure 2C:
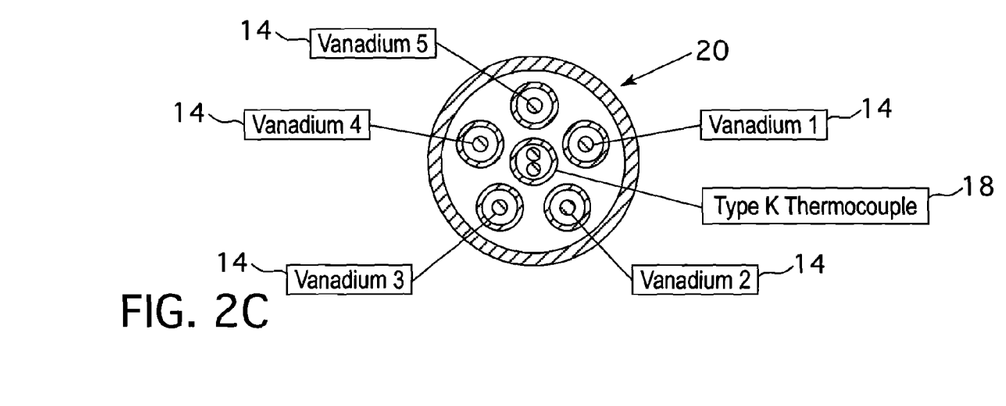
FIG. 2C is a sectional view of the electrical connector at the rear end of the in-core instrument thimble assembly of FIG. 2A.

The movable detector drives and routing systems are complicated and, due to the increased use and age are subject to failure. An option for the replacement of an aging moveable in-core detector system in an operating plant, to allow continued or extended plant operation, is a system that uses nuclear sensors that remain inserted at fixed axial and radial positions in the reactor core throughout the entire operating cycle. This type of sensor is called a fixed in-core detector and has the ability to measure the radioactivity within the core at a number of axial elevations. These sensors are used to measure the radial and axial distribution of power inside the reactor core. This power distribution measurement information is used to determine whether the reactor is operating within nuclear design power distribution limits and, thus, avoids the complexity of the moveable in-core detectors. The typical in-core sensor used to perform this measurement function produces an electric current that is proportional to the amount of fission occurring around it. This type of sensor does not require an outside source of electrical power to produce the current and is commonly referred to as a self-powered detector and is more fully described in U.S. Pat. No. 5,745,538, issued Apr. 28, 1998, and assigned to the Assignee of this invention. FIG. 1 provides a diagram of the mechanisms that produced the current I(t) in a self-powered detector element 10. A neutron sensitive material such as vanadium is employed for the emitter element 12 and emits electrons in response to neutron irradiation. Typically, the self-powered detectors are grouped within in-core instrumentation thimble assemblies. A representative in-core instrumentation thimble assembly is shown in FIG. 2. The signal level generated by the essentially non-depleting neutron sensitive emitter element 12 shown in FIG. 1, is low, however, a single, full core length neutron sensitive emitter element provides an adequate signal without complex and expensive signal processors. The portions of the full length signal generated by the single neutron sensitive emitter element attributable to various axial regions of the core are determined from a apportioning the signal generated by different lengths of gamma sensitive elements 14 which define the axial regions of the core and are shown in FIG. 2. The apportioning signals are ratioed which eliminates much of the affects of the delayed gamma radiation due to fission products. The in-core instrumentation thimble assemblies also include a thermocouple 18 for measuring the coolant temperature exiting the fuel assemblies. The electrical signal output from the self-powered detector elements and the thermocouple in each in-core instrumentation thimble assembly in the reactor core is collected at the electrical connector 20 and sent to a location well away from the reactor for final processing and use in producing the measured core power distribution.

Figure 3:
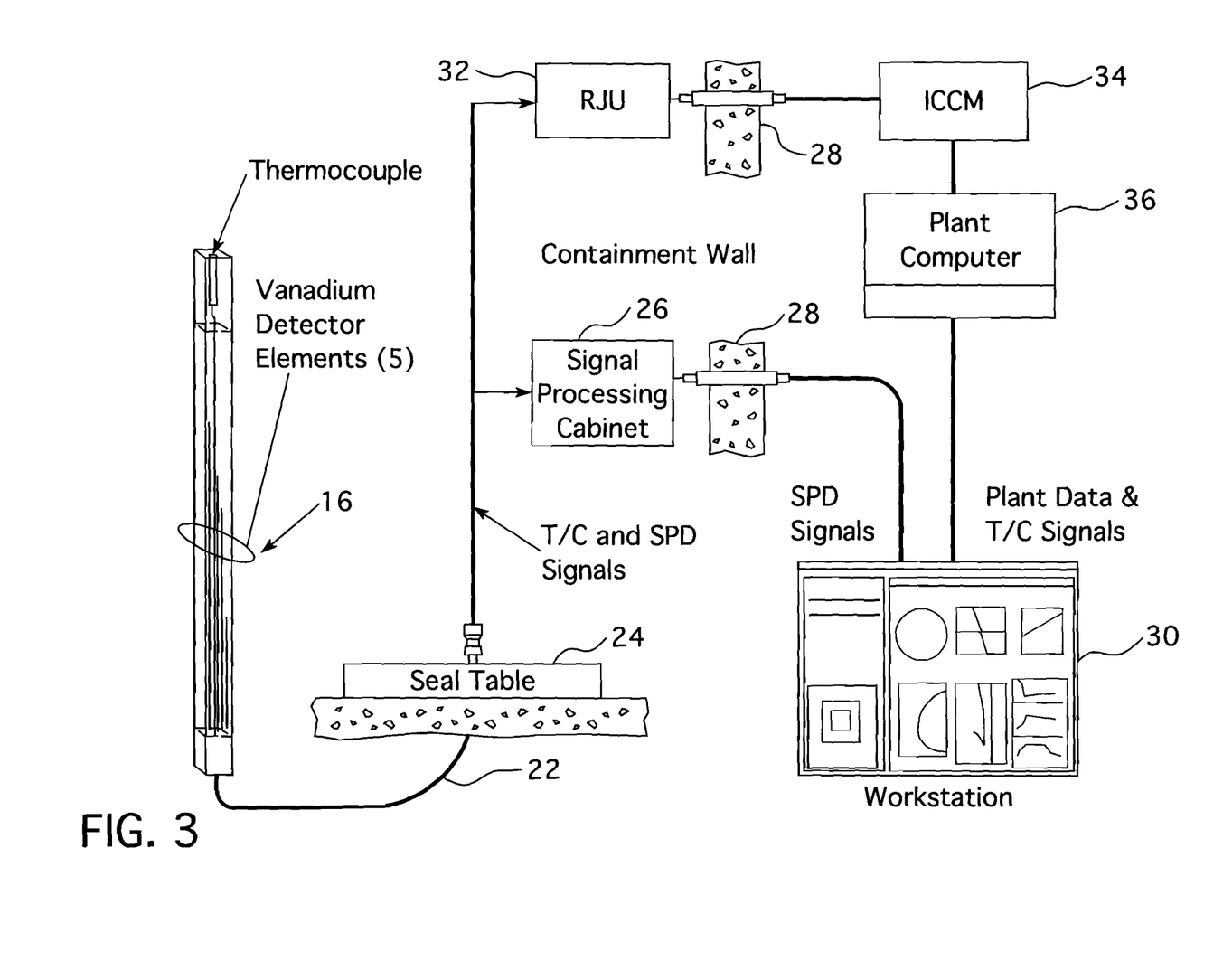
FIG. 3 is a schematic layout of an in-core monitoring system.

FIG. 3 shows an example of a core monitoring system presently offered for sale by Westinghouse Electric Company LLC with the product name WINCISE™ that employs fixed in-core instrumentation thimble assemblies 16 within the instrument thimbles of fuel assemblies within the core to measure the core's power distribution. Cabling 22 extends from the instrument thimble assemblies 16 through the containment seal table 24 and communicates the thermocouple (TIC) and self-powered detector (SPD) signals to a single processing cabinet 26 where the outputs are conditioned, digitized and multiplexed and transmitted through the containment walls 28 to a computer workstation 30 where they can be further processed and displayed. The thermocouple signals from the in-core instrumentation thimble assemblies are also sent to a reference junction unit (RJU) 32 which transmits the signals to an inadequate core cooling monitor (ICCM) 34 which communicates with the plant computer 36 which is also connected to the work station 30.

In order to replace an existing moveable in-core detector system at an operating plant, it is necessary to install the cables 22 routing the self-powered detectors 14 and thermocouples 18 signals. It is also necessary to install and power hardware 26 and 32 that can digitize and multiplex the self-powered detector signals for transmission out of the containment 28. This equipment is very expensive, and represents approximately 60% of the costs of a WINCISE™ system.

Accordingly, it is desirable to provide an improved method and apparatus for replacing moveable in-core detector systems in operating plants.

Additionally, it is desirable to provide such an improved system that does away with much of the cable routing and the electronics that need to be placed inside the containment.

Furthermore, such an improved system should preferably be self-powered and substantially maintenance free.

SUMMARY OF THE INVENTION

This invention provides apparatus and a methodology that avoids most of the cost associated with the in-containment cables, power equipment, and self-powered detector signal processing electronic hardware currently associated with replacing moveable in-core detectors with fixed in-core detectors. The method of this invention that achieves the foregoing objectives monitors the parameters indicative of a condition of an irradiated environment and generates a signal representative of the monitored parameter. In monitoring the parameter, the method generates an electrical current from the irradiated environment and uses that electrical current to power a wireless transmitter. The wireless transmitter then communicates the signal indicative of the monitored parameter to a less caustic environment, preferably outside the containment.

In one embodiment, the method includes the steps of powering the wireless transmitter from a rechargeable battery and recharging the rechargeable battery from a charger that derives its power from the irradiated environment. Desirably, the charger performing the recharging step is a self-powered radiation detector. In one application, the irradiated environment is a nuclear reactor and the wireless transmitter and charger are a part of an in-core instrument thimble assembly.

The invention also contemplates an in-core instrument thimble assembly having a self-powered radiation detector assembly responsive to a radiation environment in which it is placed to generate an electric current representative of the strength of the radiation environment. A wireless transmitter is connected to the electric current generated by the self-powered radiation detector, for transmitting at least a portion of the electric current wirelessly to a less caustic environment. The in-core instrument thimble assembly further includes a power source for powering the wireless transmitter that derives its power from the radiation environment.

Preferably, the self-powered radiation detector assembly includes a first self-powered radiation detector that supplies power to the power source. In one embodiment, the first self-powered radiation detector that suppliers power to the power source also generates the electric current representative of the strength of the radiation environment. In another embodiment, a second self-powered radiation detector generates the electric current representative of the strength of the radiation environment.

Preferably, the power source is derived from a rechargeable battery for powering the wireless transmitter and a charger is connected to the rechargeable battery that derives its power from the irradiated environment. Desirably, the charger is a self-powered radiation detector.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

The primary side of nuclear power generating systems which are cooled with water under pressure comprises a closed circuit which is isolated and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump, and a system of pipes which are connected to the vessel form a loop of the primary side.

Figure 4:
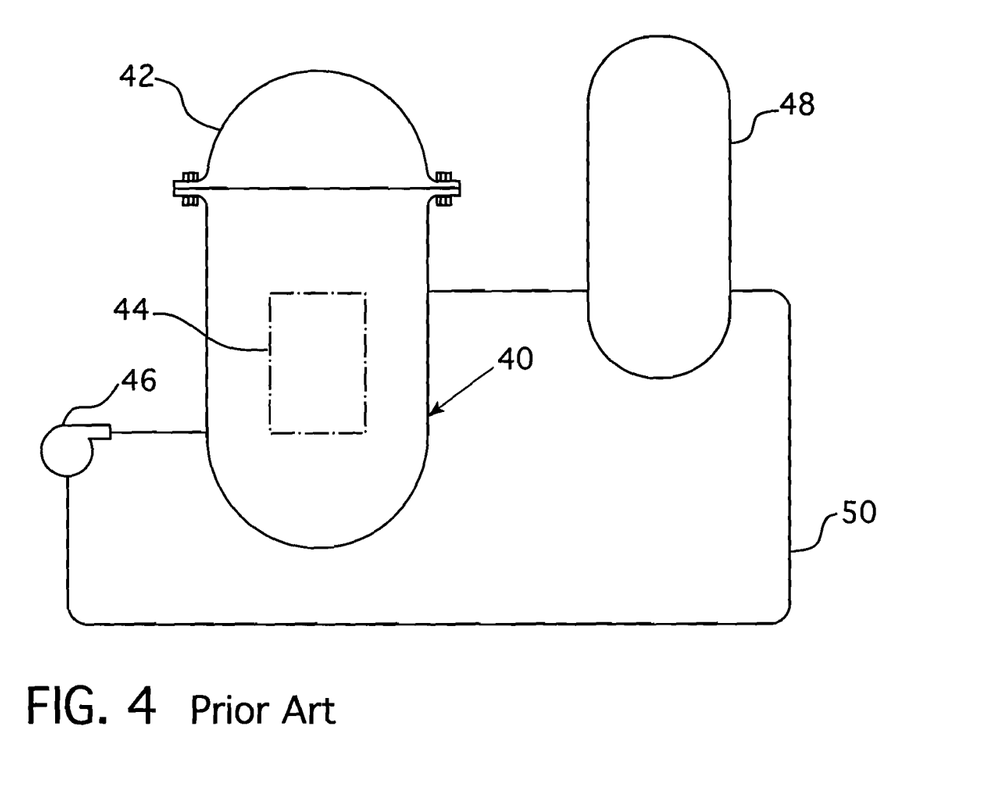
FIG. 4 is a simplified schematic of a nuclear reactor system to which this invention can be applied.

For the purpose of illustration, FIG. 4 shows a simplified nuclear reactor primary system, including a generally cylindrical reactor pressure vessel 40 having a closure head 42 enclosing a nuclear core 44. A liquid reactor coolant, such as water, is pumped into the vessel 40 by pump 46 through the core 44 where heat energy is absorbed and is discharged to a heat exchanger 48, typically referred to as a steam generator, in which heat is transferred to a utilization circuit (not shown), such as a steam driven turbine generator. The reactor coolant is then returned to the pump 46 completing the primary loop. Typically, a plurality of the above described loops are connected to a single reactor vessel 40 by reactor coolant piping 50.

Figure 5:
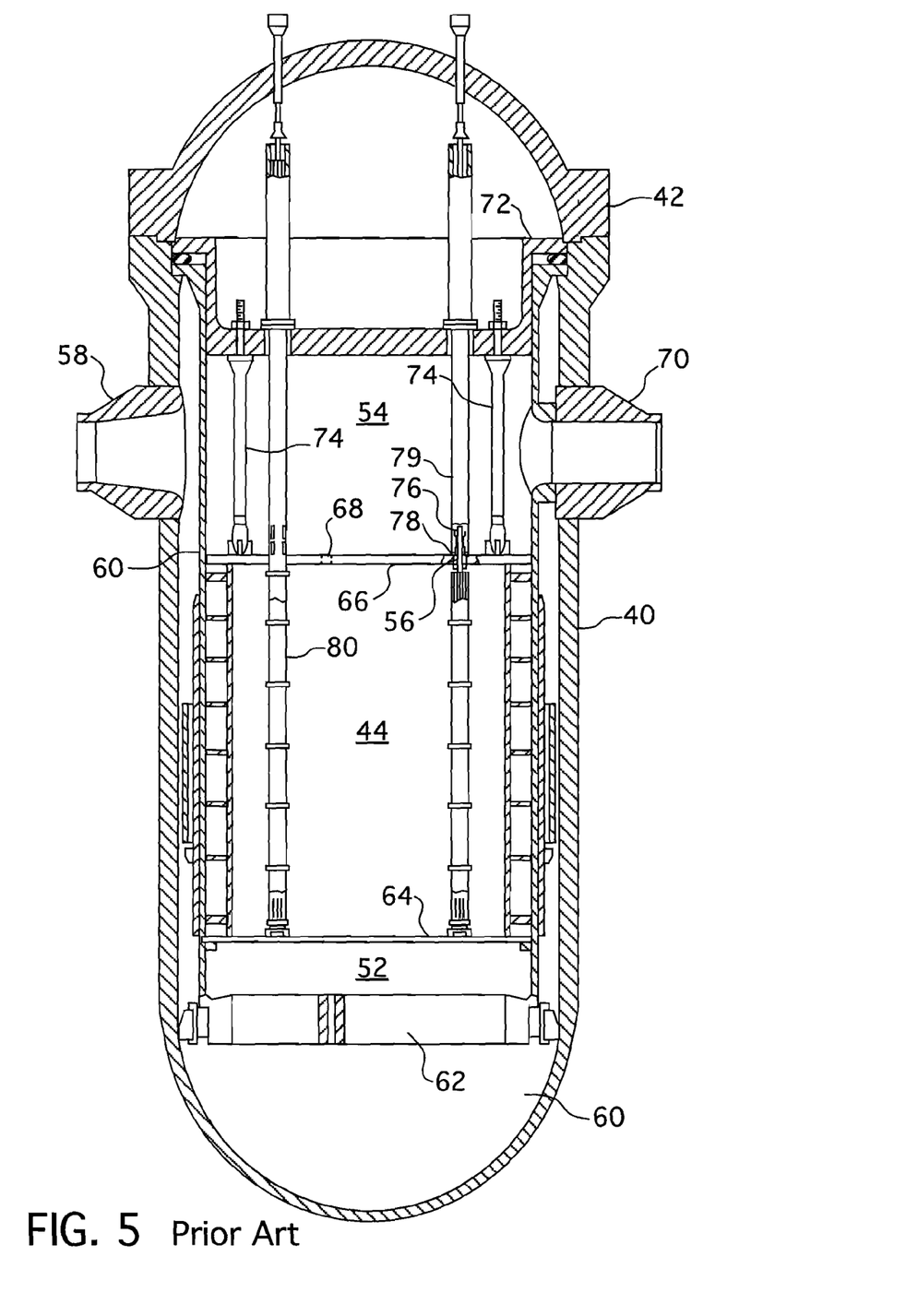
FIG. 5 is an elevational view partially in section of a nuclear reactor vessel and interior components to which this invention can be applied.

An exemplary reactor design is shown in FIG. 5. In addition to the core 44 comprised of a plurality of parallel, vertical, co-extending fuel assemblies 80, for purposes of this description, the other vessel internal structures can be divided into the lower internals 52 and the upper internals 54. In conventional designs, the lower internals' function is to support, align and guide core components and instrumentation as well as direct flow within the vessel. The upper internals 54 restrain or provide a secondary restraint for the fuel assemblies 80 (only two of which are shown for simplicity in this figure), and support and guide instrumentation and components, such as control rods 56. In the exemplary reactor shown in FIG. 5, coolant enters the reactor vessel 40 through one or more inlet nozzles 58, flows down through an annulus between the vessel 40 and the core barrel 60, is turned 180° in a lower reactor vessel plenum 61, passes upwardly through a lower support plate 62 and a lower core plate 64 upon which the fuel assemblies 80 are seated and through and about the assemblies. In some designs, the lower support plate 62 and the lower core plate 64 are replaced by a single structure, the lower core support plate that has the same elevation as 62. Coolant exiting the core 44 flows along the underside of the upper core plate 66 and upwardly and through a plurality of perforations 68. The coolant then flows upwardly and radially to one or more outlet nozzles 70.

The upper internals 54 can be supported from the vessel 40 or the vessel head 42 and includes an upper support assembly 72. Loads are transmitted between the upper support assembly 72 and the upper core plate 66, primarily by a plurality of support columns 74. Each support column is aligned above a selected fuel assembly 80 and perforations 68 in the upper core plate 66.

The rectilinearly moveable control rods 56 typically include a drive shaft 76 and a spider assembly 78 of neutron poison rods that are guided through upper internals 54 and into aligned fuel assemblies 80 by control rod guide tubes 79.

Figure 6:
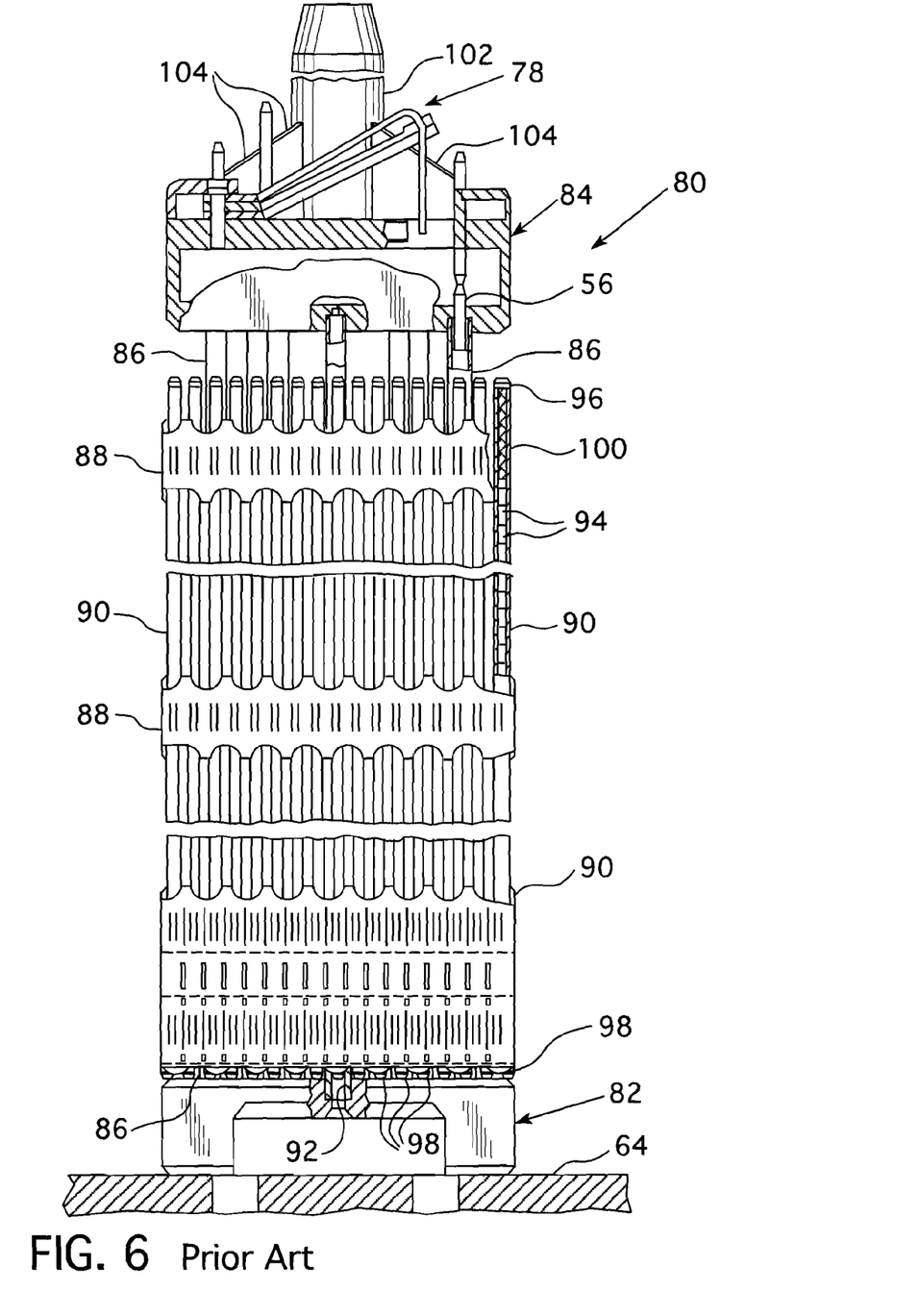
FIG. 6 is an elevational view, partially in section, of a nuclear fuel assembly.

FIG. 6 is an elevational view represented in vertically shortened form, of a fuel assembly being generally designated by reference character 80. The fuel assembly 80 is the type used in a pressurized water reactor and has a structural skeleton which at its lower end includes a bottom nozzle 82. The bottom nozzle 82 supports the fuel assembly 80 on the lower core support plate 64 in the core region of the nuclear reactor. In addition to the bottom nozzle 82, the structural skeleton of the fuel assembly 80 also includes a top nozzle 84 at its upper end and a number of guide tubes or thimbles 86, which extend longitudinally between the bottom and top nozzles 82 and 84 and at opposite ends are rigidly attached thereto.

The fuel assembly 80 further includes a plurality of transverse grids 88 axially spaced along and mounted to the guide thimbles 86 (also referred to as guide tubes) and an organized array of elongated fuel rods 90 transversely spaced and supported by the grids 88. Although it cannot be seen in FIG. 6, the grids 88 are conventionally formed from orthogonal straps that are interleaved in an egg-crate pattern with the adjacent interface of four straps defining approximately square support cells through which the fuel rods 90 are supported in transversely spaced relationship with each other. In many conventional designs, springs and dimples are stamped into the opposing walls of the straps that form the support cells. The springs and dimples extend radially into the support cells and capture the fuel rods therebetween; exerting pressure on the fuel rod cladding to hold the rods in position. Also, the assembly 80 has an instrumentation tube 92 located in the center thereof that extends between and is mounted to the bottom and top nozzles 82 and 84. With such an arrangement of parts, the fuel assembly 80 forms and integral unit capable of being conveniently handled without damaging the assembly of parts.

As mentioned above, the fuel rods 90 in the array thereof in the assembly 80 are held in spaced relationship with one another by the grids 88 spaced along the fuel assembly length. Each fuel rod 90 includes a plurality of nuclear fuel pellets 94 and is closed at its opposite ends by upper and lower end plugs 96 and 98. The fuel pellets 94 are maintained in a stack by a plenum spring 100 disposed between the upper end plug 96 and the top of the pellet stack. The fuel pellets 94, composed of fissile material, are responsible for creating the reactive power of the reactor. The cladding, which surrounds the pellets, functions as a barrier to prevent the fission by-products from entering the coolant and further contaminating the reactor system.

To control the fission process, a number of control rods 56 are reciprocably movable in the guide thimbles 86 located at predetermined positions in the fuel assembly 80. Specifically, a rod cluster control mechanism (also referred to as a spider assembly) 78 positioned above the top nozzle 84 supports the control rods 56. The control mechanism has an internally threaded cylindrical hub member 102 with a plurality of radially extending flukes or arms 104 that with the control rods 56 form the spider assembly 78 that was previously mentioned with respect to FIG. 5. Each arm 104 is interconnected to the control rods 56 such that the control rod mechanism 78 is operable to move the control rods vertically in the guide thimbles 86 to thereby control the fission process in the fuel assembly 80, under the motive power of control rod drive shafts 76 (shown in FIG. 5) which are coupled to the control rod hubs 102, all in a well-known manner.

Figure 7:
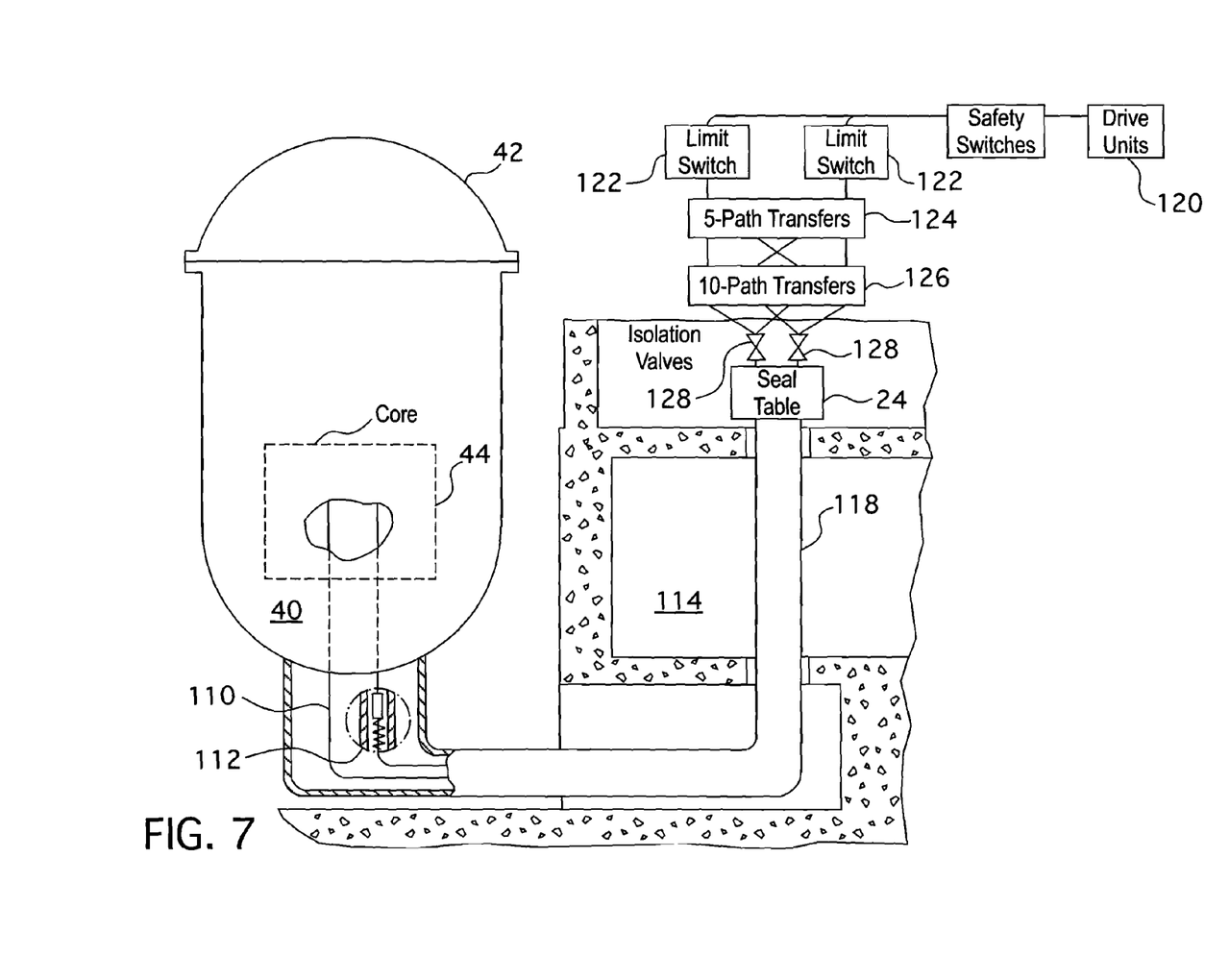
FIG. 7 is a perspective view of a basic in-core moveable detector mapping system employed in many operating plants.

As previously mentioned, to map the axial power distribution, to assure plant design limits are not exceeded, many conventional plants employ moveable in-core detectors such as are illustrated in FIG. 7. The in-core mapping system generally comprises four to six detector/drive assemblies, depending upon the size of the plant, which are interconnected in such a fashion that they can access various combinations of in-core flux thimbles that extend within the instrumentation tubes 92 within the fuel assemblies 80. To obtain the thimble interconnection capability, each detector has associated with it a five-path and ten-path rotary mechanical transfer device. A core map is made by selecting, by way of the transfer devices, particular thimbles through which the detectors are driven.

FIG. 7 shows the basic system for the insertion of the moveable in-core radiation detectors. Retractable thimbles 110 into which the moveable radiation detectors 112 are driven, take the routes approximately as shown. The thimbles 110 are inserted into the reactor core 44 through conduits 118 extending from the bottom of the reactor vessel 40 through the concrete shield area 114 and then up to a thimble seal table 24. Since the moveable detector in-core flux thimbles are closed at the leading (reactor) end, they are dry inside. The in-core flux thimbles thus serve as a pressure barrier between the reactor water pressure (2500 psig design) and the atmosphere. Mechanical seals between the retractable thimbles 110 and the conduits 118 are provided at the sealed table 116. The conduits 118 are essentially extensions of the reactor vessel 40, with the thimbles 110 allowing the insertion of the in-core instrumentation moveable detectors 112. During operation, the thimbles 110 are stationary and will be retracted only under depressurized conditions during fueling or maintenance operations.

The drive system for insertion of the moveable in-core detectors includes drive units 120, limit switch assemblies 122, five-path rotary transfer devices 124, ten-path rotary transfer devices 126 and isolation valves 128, as shown.

Each drive unit pushes a hollow, helical-wrap drive cable into the core with a miniature moveable detector 112 attached to the leading end of the cable and a small diameter coaxial cable, which communicates the detector output, threaded through the hollow center of the helical-wrap drive, back to the trailing end of the drive cable. The electronics for transferring the detector signals to the control room is similar to the schematic layout shown in FIG. 3 and previously described for a fixed in-core detector system. The preferred embodiment of the methodology described herein for this invention allows elimination of most of the cost associated with in-containment cables, power equipment, and detector signal processing electronics hardware that would otherwise be necessary if the moveable flux mapping detector systems were replaced with the fixed in-core detector system previously described.

Figure 8:
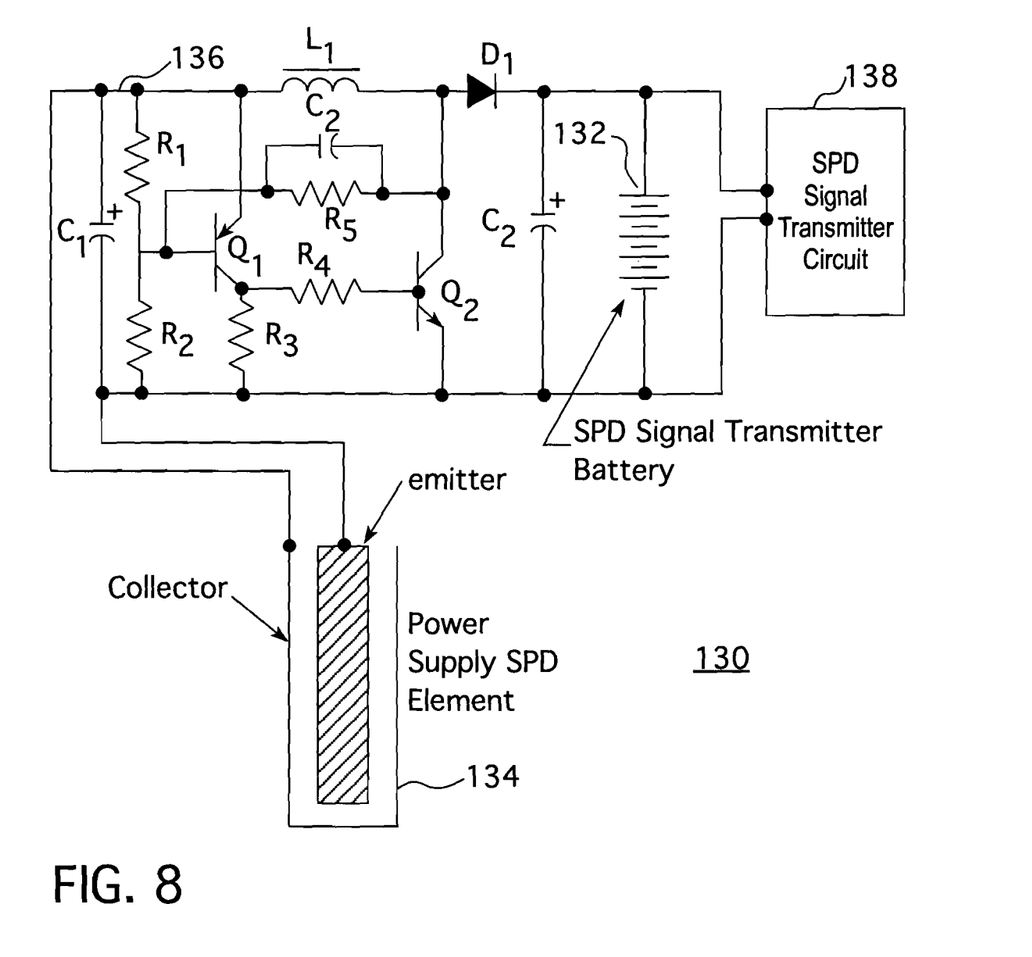
FIG. 8 is a schematic circuitry diagram of a power supply that can be employed by this invention.

The preferred embodiment relies on the use of small radio frequency transmitters that are attached to the electrical connector outputs of the in-core instrument thimble assemblies, like the one shown in FIGS. 2A, 2B and 2C, described above. However, it should be appreciated that other wireless transmitters, such as infrared transmitters may be used as well, with compatible receivers, provided the receivers can be situated within a line of sight. The electrical hardware used in accordance with this invention to measure and transmit the individual self-powered detector signals (either analog or digital) is contained in a small environmentally qualified container that is either integral with the in-core instrument thimble assembly 16 design, or may be attached as a stand-alone device. The primary electrical power source for the signal transmitting electrical hardware is a rechargeable battery 132 shown as part of the exemplary power supply illustrated in FIG. 8. In accordance with one embodiment of this invention, the charge on the battery 132 is maintained by the use of the electrical power produced by a dedicated power supply self-powered detector element 134 that is contained within the power supply 130, so that the nuclear radiation in the reactor is the ultimate power source for the device keeping the battery 132 charged. The power supply self-powered detector element 134 is connected to the battery 132 through a conditioning circuit 136 and the battery is in-turn connected to a signal transmitter circuit 138 that transmits the signal received from the fixed in-core detector monitoring the core such as was described with respect to FIGS. 2A, 2B and 2C. Alternately, a certain percentage of the power being generated by the monitoring detectors could be diverted to the signal conditioning circuit 136 to charge the battery 132 to power the signal transmitter circuit 138. In this latter embodiment, the remainder of the power from the monitoring circuits could be then communicated to the transmitter circuit 138 for communication wirelessly to a receiving circuit outside the nuclear containment. The monitored signal thus received would then have to be calibrated to compensate for the strength of the signal that was diverted to power the signal transmitting circuit 138. The specific design of the power supply shown in FIG. 8 will solely depend on the amount of power required to transmit the self-powered detector signal data to the receiver. The amount of power needed depends on the signal transmission distance and the radio frequency signal to noise characteristics of the particular operating environment. In general, the power supply is designed to produce power based on the amount of gamma radiation around it to provide the longest lifetime and power generation capabilities at low reactor power levels. There are a number of existing platinum-based self-powered detector designs, such as is described in U.S. Pat. No. 5,745,538, that will provide suitable performance for common applications.

Figure 9:
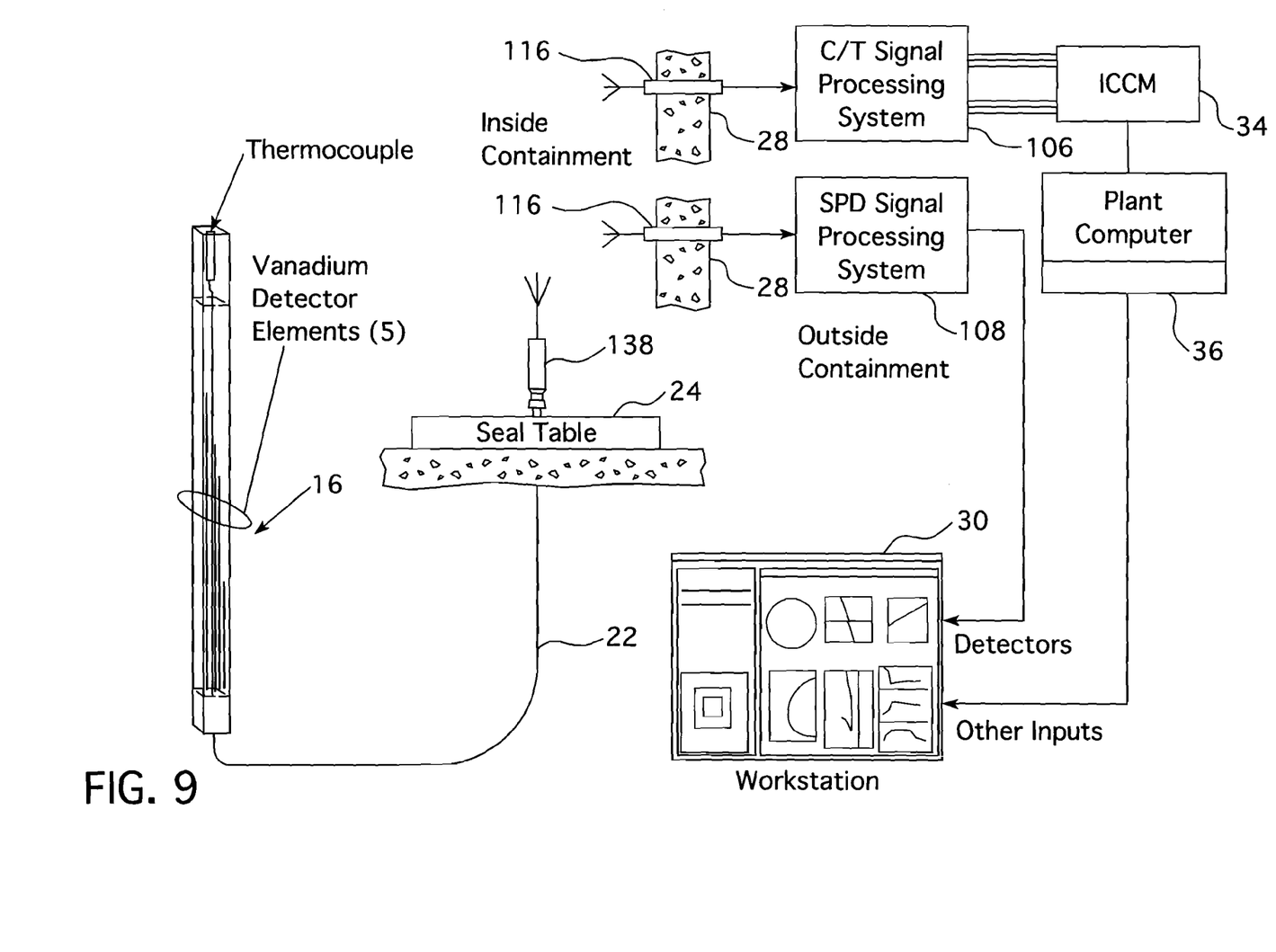
FIG. 9 is a schematic layout of a self-powered wireless in-core instrumentation core power distribution measurement system in accordance with this invention.

FIG. 9 shows a schematic layout of a self-powered wireless in-core detector instrumentation core power distribution measurement system constructed in accordance with this invention. The schematic layout illustrated in FIG. 9 is identical to the schematic layout illustrated in FIG. 3 for a conventional in-core monitoring system except that the cabling within the containment above the seal table 24 has been replaced by the wireless transmitter 138 and wireless receivers 116 and the in-containment electronics 26 and 32 have been respectively replaced by the SPD signal processing system 108 and the core exit thermocouple signal processing system 106, located outside the containment 28. In all other respects, the systems are the same. Thus, this invention greatly simplifies the replacement of the conventional in-core moveable detectors illustrated in FIG. 7 with the fixed in-core detectors illustrated in FIGS. 2A, 2B and 2C.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of transmitting a monitored parameter from a highly caustic irradiated environment in which a plurality of atoms are undergoing a fission reaction to a less caustic environment comprising the steps of:

monitoring the parameter indicative of a condition of the highly irradiated environment and generating a signal representative of the monitored parameter;

generating an electrical current at a location proximate the highly caustic irradiated environment, as a byproduct of the fission reaction;

using the electrical current to power a wireless transmitter; and employing the wireless transmitter to wirelessly communicate the signal to the less caustic environment.

2. The method of claim 1 wherein the generating step is powered by a self-powered radiation detector.

3. The method of claim 1 including the steps of:

powering the wireless transmitter from a rechargeable battery; and recharging the rechargeable battery from a charger that derives its power from the irradiated environment.

4. The method of claim 3 wherein the charger performing the recharging step is a self-powered radiation detector.

5. An in-core instrument thimble assembly for disposition in a core of a nuclear reactor, comprising:

a self-powered radiation detector assembly responsive to a radiation environment in which it is placed to generate an electric current representative of the strength of the radiation environment;

a wireless transmitter connected to the electric current for transmitting at least a portion of the electric current wirelessly to a less caustic environment; and a power source for powering the wireless transmitter that derives its power from the radiation environment.

6. The in-core instrument thimble assembly of claim 5 wherein the self-powered radiation detector assembly includes a first self-powered radiation detector that supplies power to the power source.

7. The in-core instrument thimble assembly of claim 6 wherein the first self-powered radiation detector that supplies power to the power source also generates the electric current representative of the strength of the radiation environment.

8. The in-core instrument thimble assembly of claim 6 including a second self-powered radiation detector that generates the electric current representative of the strength of the radiation environment.

9. The in-core instrument thimble assembly of claim 5 wherein the power source comprises:
   a rechargeable battery for powering the wireless transmitter; and
   a charger connected to the rechargeable battery that derives its power from the irradiated environment.

10. The in-core instrument thimble assembly of claim 9 wherein the charger is a self-powered radiation detector.

11. A method of transmitting a monitored parameter from a highly caustic irradiated environment within a nuclear reactor in which a plurality of atoms are undergoing a fission reaction, to a less caustic environment comprising the steps of:
   monitoring the parameter indicative of a condition of the highly irradiated environment and generating a signal representative of the monitored parameter;
   generating an electrical current at a location proximate the highly caustic irradiated environment, the electrical current being generated by a self powered radiation detector as part of an in-core instrument thimble assembly, as by-product of the fission reaction;
   using the electrical current to recharge a rechargeable battery powering a wireless transmitter; and
   employing the wireless transmitter to wirelessly communicate the signal to the less caustic environment.

\* \* \* \* \*